Nov. 8, 1927.
C. E. BONNER
1,648,440
LUBRICATING DEVICE
Filed May 31, 1923
4 Sheets-Sheet 1
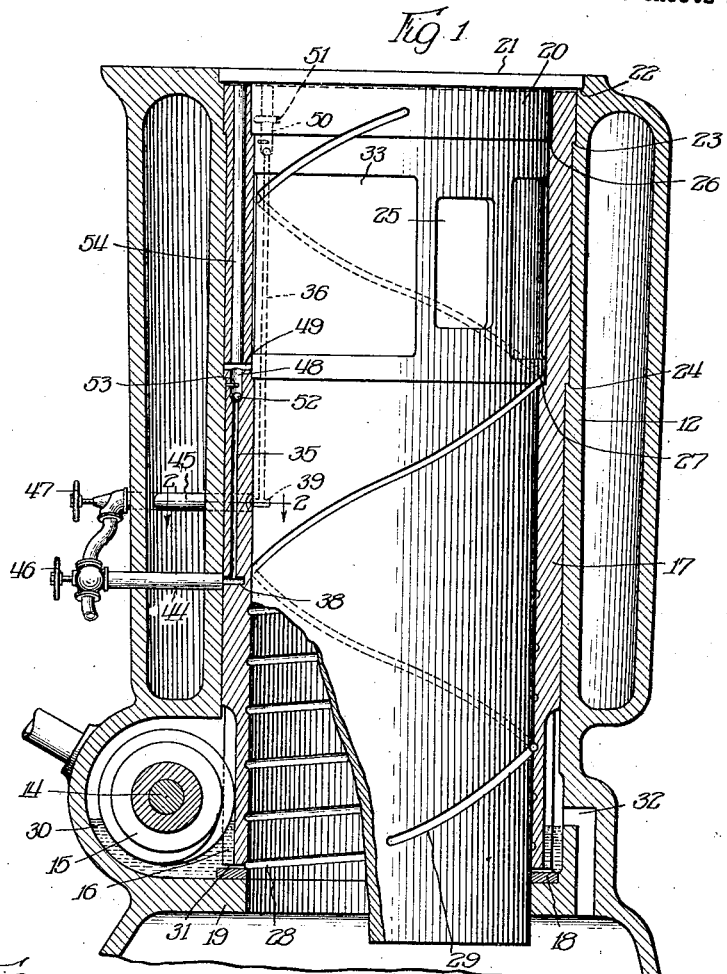
Witness:
R. Burkhardt
Inventor:
Clarence E. Bonner,
By Wilkinson Huxley Byron & Knight
Attys.

Nov. 8, 1927.

C. E. BONNER 1,648,440

LUBRICATING DEVICE

Filed May 31, 1923      4 Sheets-Sheet 2

Witness:
R. Burkhardt.

Inventor:
Clarence E. Bonner,
By Wilkinson Huxley Byron & Knight
Attys.

Nov. 8, 1927.
C. E. BONNER
1,648,440
LUBRICATING DEVICE
Filed May 31, 1923
4 Sheets-Sheet 3
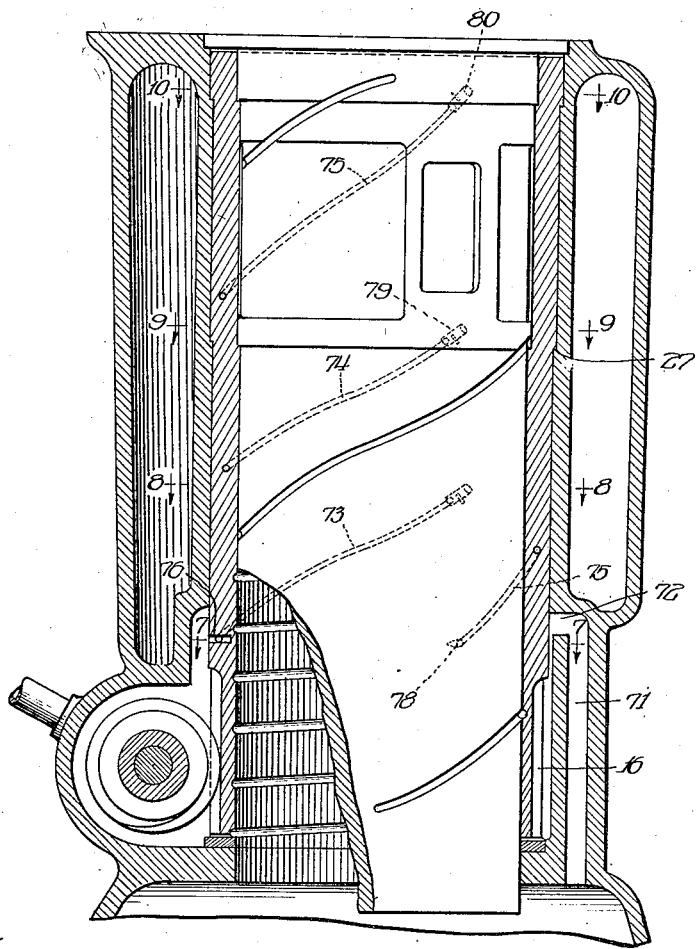
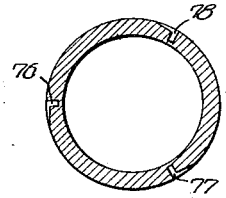 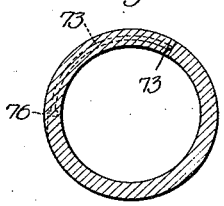 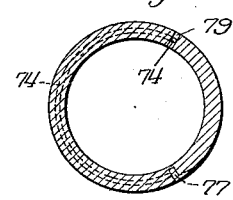 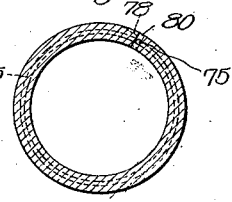
Inventor:
Clarence E. Bonner,

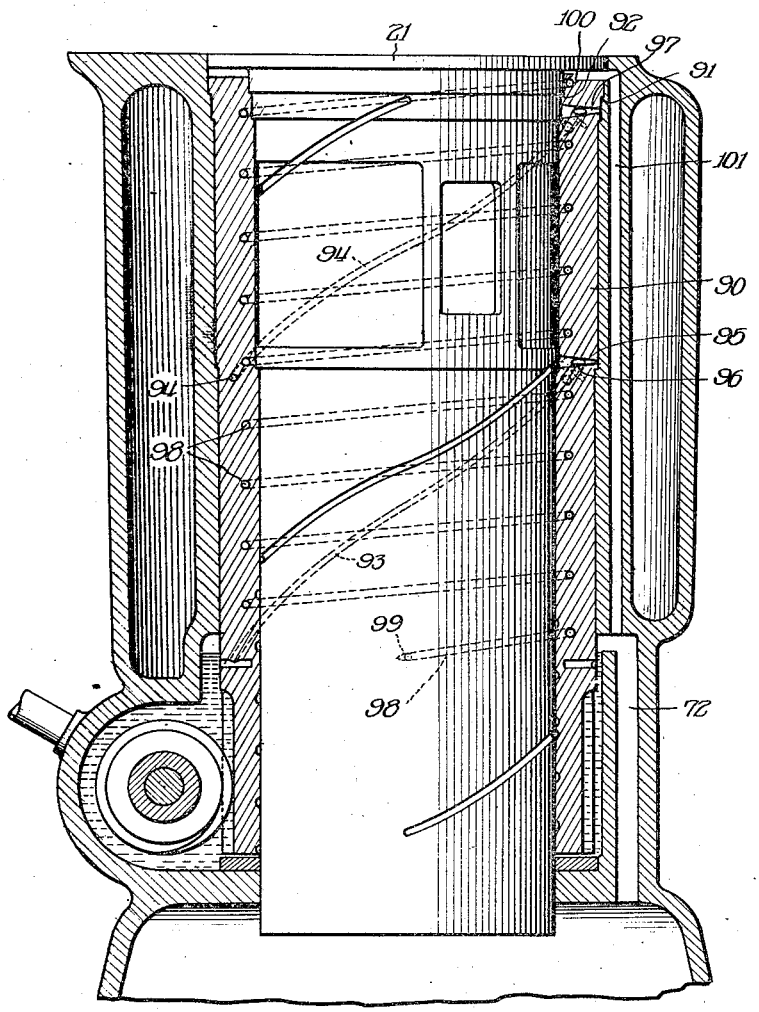

Patented Nov. 8, 1927.

1,648,440

UNITED STATES PATENT OFFICE.

CLARENCE E. BONNER, OF NEW YORK, N. Y., ASSIGNOR, BY MESNE ASSIGNMENTS, TO BONNER-CHARTER CORPORATION, OF DOVER, DELAWARE, A CORPORATION OF DELAWARE.

LUBRICATING DEVICE.

Application filed May 31, 1923. Serial No. 642,437.

This invention relates to a new and improved lubricating means for internal combustion engines and more specifically to means for positively lubricating the upper portions of the cylindrical valve members in motors of the sleeve valve type.

In sleeve valve motors, it is important that the upper portions of the sleeve valves and adjacent cylinder faces be adequately lubricated since it is these surfaces which undergo the greatest heat and wear. The force of the explosion tends to spring the cylinder walls outwardly and presses them against the adjacent sleeve valve walls. This pressure makes necessary thorough lubrication in order to prevent undue friction and wear in such valves.

In motors equipped with valves of this type, there is a tendency for the forces of the explosion acting through the inlet port of the inner cylinder and against the adjacent portion of the sleeve valve to force their way between the sleeve valve and inner cylinder. This pressure renders it difficult to adequately lubricate at this point since it forces the lubricant away at each explosion. It is thus also difficult to pass lubricant upward between the cylinder and sleeve valve to adequately lubricate the contacting surfaces of these members above the port openings.

It is an object of the present invention to provide a construction in which passages are formed in the sleeve valve member adapted to convey lubricant to the upper portions of the construction.

It is also an object to provide means of this character in which means are provided to prevent back pressure upon the lubricant during the explosion period in the cylinder.

It is an additional object to provide in such constructions a plurality of oil passages adapted to deliver the oil at selected points upon the elevation of the engine parts.

It is a further object to provide means of this character in which the oil circulating through the passages in the sleeve valve tends to cool the sleeve valve and adjacent parts.

Other and further objects will appear as the description proceeds.

I have illustrated certain preferred embodiments of my invention in the accompanying drawings, in which:

Figure 1 is a fragmentary vertical section, partly in elevation, showing one form of the invention applied to a sleeve valve motor;

Figure 2 is a fragmentary section taken on line 2—2 of Figure 1;

Figure 3 is a fragmentary section taken on line 3—3 of Figure 2.

Figure 6 is a view similar to Figure 1 showing a further modified form;

Figure 7 is a horizontal section on a reduced scale taken on line 7—7 of Figure 5;

Figure 8 is a horizontal section on a reduced scale taken on line 8—8 of Figure 5;

Figure 9 is a horizontal section on a reduced scale taken on line 9—9 of Figure 5;

Figure 10 is a horizontal section on a reduced scale taken on line 10—10 of Figure 5; and Figure 11 is similar to Figure 1, showing a still further modified form of construction.

Figure 4:
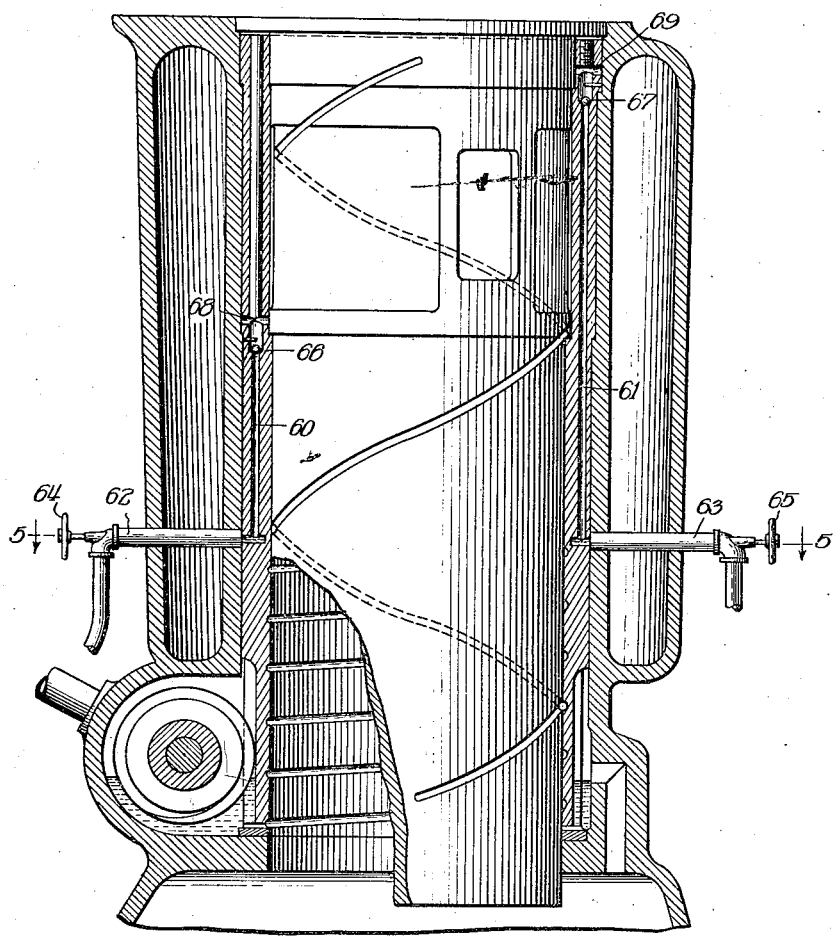
Figure 4 is a view similar to Figure 1 showing a modified form of construction.

Referring first to the form of construction shown in Figures 1, 2 and 3, the outer cylinder member 12 is provided with the water jacket 13 and carries the shaft 14 upon which is fitted gear 15 meshing with the gear 16 cut in the sleeve valve member 17. The member 17 rests upon ring 18 which is fitted upon shoulder 19 of the outer cylinder member. The inner cylinder member 20 is fitted within the sleeve valve 17 and is provided at its upper end with the flange 21 which is seated in the circumferential recess 22 in the outer cylinder member 12. The lower end of the cylinder member 20 is retained in place by the shoulder 19.

The sleeve valve member 17 and the outer cylinder member 12 are provided with interfitting circumferential steps at points 23 and 24 and located above and below the port opening 25. The interfitting faces of the sleeve valve 17 and inner cylinder 20 are provided with similar steps at points 26 and 27.

The inner face of the sleeve valve member 17 is provided with the spiral lubricating groove 28. The outer face of the inner cylinder member 20 is provided with the reversely extending spiral groove 29 which is upon a steeper pitch than the groove 28. It will be noted that the groove 28 extends only upon the lower portion of the sleeve valve while the groove 29 extends to a point above the port openings.

The shaft 14 and gears 15 and 16 are contained in an oil reservoir 30 and this reservoir communicates by means of notches 31 formed in the lower edge of the sleeve valve 17 with the interfitting surfaces of the sleeve valve and inner cylinder member. The overflow drain 32 prevents the oil in the reservoir 30 from rising above a predetermined limit.

The inner cylinder member is formed with the shallow recesses 33 which extend in height the greater portion of the effective cylinder height and which serve to minimize the frictional engagement between the cylinder and sleeve valve when the explosions occur in the motor.

The sleeve valve member 17 is provided with a plurality of bores 34, 35 and 36 which extend vertically of the sleeve valve. These bores are intersected by the radial bores 37, 38 and 39 which extend through the outer wall of the sleeve valve member. The scuppers 40, 41 and 42 are formed in the outer face of the sleeve valve member and lead to these radial bores, the rear end of the scupper being preferably coincident with the wall of the bore as shown in Figure 2. It will be understood that the sleeve valve normally rotates in the counterclockwise direction considered relative to Figure 2.

The pipes 43, 44 and 45 extend through the outer cylinder member and are located upon different planes, each being located in the plane of one of the radial bores 37, 38 and 39. These pipes are controlled by valves, the valve 46 controlling pipe 44 and the valve 47 controlling pipe 45 as shown in Figure 1. As shown in Figure 2 the bores are spaced circumferentially the same distance as are spaced the pipes so that the pipes are in registration with their respective bores simultaneously.

As shown in Figure 1, the vertical bore 35 is provided with the enlarged upper portion 48 and with the transverse bore 49 which extends through to both surfaces of the sleeve valve. The bore 36 is provided with a similar enlarged upper portion 50 and with the transverse bore 51 and the bore 34 is similarly constructed at its upper end. The ball valve 52 rests upon its seat formed at the junction of the bores 35 and 38 and is retained against upward displacement by pin 53. That portion of the bore 48 above the cross bore 49 is filled by a plug 54. It will be understood that the other bores are provided with similar ball check valves and have their portions above their transverse outlets filled with plugs. It will be noted that the bore 35 is adapted to discharge lubricant above the shoulders 27 but below the ports, while the bore 36 is adapted to discharge above the steps 26, and bore 34 below the shoulders 27.

Figure 5:
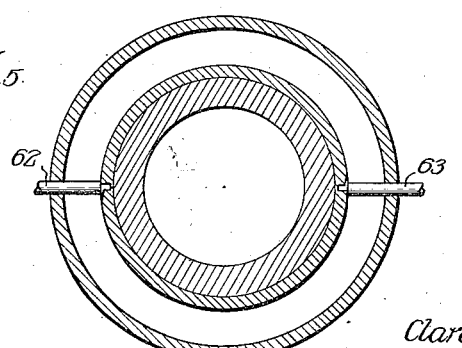
Figure 5 is a horizontal section on a reduced scale taken on line 5—5 of Figure 4.

Referring now to the form of construction shown in Figures 4 and 5, the engine construction is exactly similar to that which has been already described. The two vertically extending oil fitting bores 60 and 61 are spaced 180° apart. These bores are fed from the pipes 62 and 63, respectively, these pipes being controlled by valves 64 and 65. The bores 60 and 61 are provided with the ball check valves 66 and 67 similar to those described in connection with the first form. The bore 60 communicates with the transverse bore 68 located below the port, while the bore 61 communicates with the bore 69 located above the port.

The form of construction shown in Figures 6 to 10 is shown upon an engine which differs slightly from that shown in the previous figures. In this form of construction the oil outlet passage 71 has its intake 72 located at a height above the upper limit of the gear 16. The sleeve valve member is provided with three spirally extending passages 73, 74 and 75. The lower ends of these passages intersect the transverse bores 76, 77 and 78, respectively, the relation of these bores being shown in Figure 6. Each of these bores is provided with a scupper as shown in Figure 6, which is located above the gear 16 but below the oil level in the reservoir. Each bore is provided at its upper portion with a ball check as shown in connection with bores 74 and 75 in Figure 5.

The bore 73 extends through approximately 120° as shown in Figure 7 and discharges at a point below the step 27. The bore 74 discharges above this step through the axial bore 79. The bore 75 extends a full circumference and discharges at 80 above the step 26. It will be noted that the entrance bores or all three oil passages are located in the same plane which plane is below the level of the oil in the oil reservoir as established by the passage 72. Consequently, all of the passages are continuously in communication with the oil supply. Back pressure is effectively prevented by means of the ball check valves.

In the form of construction shown in Figure 11, the engine is similar to that shown in Figure 5 with the exception that sleeve valve member 90 is thicker and is provided at its upper end with additional steps 91 and 92 upon the inner and outer faces, respectively. The two spiral lubricating bores 93 and 94 are provided in the sleeve valve, both bores communicating with the oil in the reservoir.

The bore 93 discharges oil through the cross bore 95 below the port. It will be noted that the inwardly extending portion of bore 95 is of greater diameter than the outwardly extending portion 96. This difference in size is due to the fact that centrifugal force tends to feed outwardly a greater amount of oil than inwardly if the bores are of the same size. The cross bore 97 through which the vertical bore 94 discharges is similarly smaller in its outer portion.

As an additional feature the sleeve valve 90 is provided with the spirally extending passage 98 which is fed through opening 99 located below the oil level in the reservoir. This spiral passage opens at 100 in the upper surface of the sleeve valve, a clearance being provided between the upper end of the sleeve valve and the flange 21 on the inner cylinder member. The vertically extending passage 101 formed in the outer cylinder member communicates with the clearance between the top of the sleeve valve and cylinder and its lower end discharges into the oil discharge passage 72 leading from the oil reservoir.

In the operation of the form of construction shown in Figures 1 to 3, the location of the vertical bores is so related to that of the ports that the bores register with their feed pipes during the suction stroke of the piston so that there is no tendency for back pressure to interfere with the upward passage of the oil, but on the contrary, any leakage of pressure will be in the nature of a suction aiding in this movement of the oil. It will be understood that the oil is fed through the pipes to the cylinder under pressure and this pressure is effective in introducing the oil into the sleeve valve bores. The scuppers at the entrance of the bores may be made of any desired length so as to keep the bore in communication with the feed pipes for any desired portion of the revolution of the valve member.

While this form of lubrication has been shown as auxiliary to the lubrication of the related spiral grooves 28 and 29, it will be understood that it is in effect entirely independent of them and may be used upon engines in which these grooves are not present. The method of lubrication by these opposed grooves is covered by my prior application, Serial No. 459,699, filed April 8, 1921.

While the bores have all been shown as feeding oil to both the inner and outer surfaces of the sleeve valve, it is obvious that the feed bores may be closed in one direction if desired so that each bore feeds only the inner or outer surface as preferred.

In the form of constructions shown in Figures 4 and 5, the method of oil feed and distribution is similar to that of the first figures but the oil is simultaneously fed at points 180° apart upon the sleeve valve. This feeding as in the other constructions, preferably takes place during the suction stroke of the engine.

The form of construction shown in Figures 6 to 10 does not rely upon a force feed of the oil to elevate it in the bores. The elevation is accomplished by the spiral grooves which incline upwardly and rearwardly relative to the direction of rotation of the sleeve valve. The scooping action and the inertia of the oil in the passages thus causes the oil to be raised in the grooves. In this construction as in the others the ball check valves prevent back pressure during the explosion in the cylinder. In this method, oil is continuously fed throughout the revolution with the exception of such periods as the explosion may cause the ball valves to stop the passage.

The form of construction shown in Figure 11 also relies upon the scooping action and the rotation for elevating the oil, the lubricating passages being continuously in communication with the oil in the reservoir. The oil is similarly elevated in the spiral cooling passage and returns by gravity from the top of the cylinder to the oil sump in the crank case.

In this form of construction the additional steps above the transverse oiling bore 97 prevents leakage of the cooling oil down to add to the lubricating oil. However, in some constructions, it may be desirable to omit this step and the upper transverse lubricating bore and to permit a portion of the cooling flow to serve to lubricate the upper portion of the contacting faces.

In this form of construction the outer portions of the transverse discharge bores have been made smaller than the inner portions so as to equalize the oil distribution upon the outer and inner surfaces. This variation is necessary because of the effect of centrifugal force in throwing the oil outwardly. By proper variation in the relative sizes of these portions of the bores the distribution of oil inwardly and outwardly may be properly co-ordinated.

While I have illustrated certain preferred embodiments of my invention, it is obviously capable of further modification to meet varying conditions and it is my intention to cover such modifications as come within the scope of the appended claims.

I claim:

1. Lubricating means for sleeve valve motors comprising means adapted to supply lubricant to the sleeve valve, a passage formed in the sleeve valve and adapted to convey lubricant to a portion of the sleeve surface spaced from the lubricant supply, and means adapted to prevent a reverse fluid flow in said passage.

2. In an internal combustion engine, a sleeve valve, a fluid conveying passage formed in the sleeve valve member, and means in said passage adapted to limit fluid flow therethrough to one direction.

3. In an internal combustion engine, a sleeve valve, a fluid conveying passage formed in the sleeve valve member, and a ball check valve in said passage adapted to limit fluid flow therethrough to one direction.

4. In an internal combustion engine, a sleeve valve, a port extending through said sleeve valve member, a fluid passage formed in said member, the passage having openings extending through the valve member walls upon opposite sides of the port, one of said openings being closer to the port than the other and means in said passage adjacent the port adapted to prevent pressure from the port from passing through said passage.

5. In an internal combustion engine, a rotating sleeve valve, an inclined fluid conveying passage formed in said valve member, inlet and discharge openings extending from said passage through the walls of the valve member, and a fluid reservoir in communication with said inlet opening, the inclined passage extending upwardly and rearwardly relative to the direction of normal rotation of the valve member.

6. In an internal combustion engine, a sleeve valve, a fluid conveying passage formed in said valve member, intake and discharge openings extending from the passage through the valve wall, the discharge openings extending to both the inner and outer faces of the valve member, and the opening upon the inner face being greater in area than that upon the outer face.

Signed at New York, New York, this 23rd day of May, 1923.

CLARENCE E. BONNER.